COMBINED SLIDE AND CARD PROJECTION APPARATUS FOR TELEVISION

Filed Nov. 10, 1951 9 Sheets-Sheet 1

INVENTOR.
FREEMAN H. OWENS
BY
Philip S. McLean
ATTORNEY

June 12, 1956 F. H. OWENS 2,750,444

COMBINED SLIDE AND CARD PROJECTION APPARATUS FOR TELEVISION

Filed Nov. 10, 1951 9 Sheets-Sheet 2

INVENTOR.
FREEMAN H. OWENS
BY Philip S. McLean
ATTORNEY

June 12, 1956 F. H. OWENS 2,750,444

COMBINED SLIDE AND CARD PROJECTION APPARATUS FOR TELEVISION

Filed Nov. 10, 1951 9 Sheets-Sheet 3

INVENTOR
BY FREEMAN H. OWENS
Philip S. McLean
ATTORNEY

COMBINED SLIDE AND CARD PROJECTION APPARATUS FOR TELEVISION

INVENTOR.
FREEMAN H. OWENS
BY Philip S. McLean
ATTORNEY

INVENTOR.
FREEMAN H. OWENS
BY
Philip S. McLean
ATTORNEY

COMBINED SLIDE AND CARD PROJECTION APPARATUS FOR TELEVISION

Filed Nov. 10, 1951

INVENTOR.
FREEMAN H. OWENS
BY
Philip S. McLean
ATTORNEY

INVENTOR.
FREEMAN H. OWENS
BY
Philip S. McLean
ATTORNEY

COMBINED SLIDE AND CARD PROJECTION APPARATUS FOR TELEVISION

Filed Nov. 10, 1951 9 Sheets-Sheet 8

INVENTOR.
FREEMAN H. OWENS
BY
Philip S. McLean
ATTORNEY

COMBINED SLIDE AND CARD PROJECTION APPARATUS FOR TELEVISION

Filed Nov. 10, 1951 9 Sheets-Sheet 9

INVENTOR
FREEMAN H. OWENS
BY Philip S. McBean
ATTORNEY

United States Patent Office 2,750,444

Patented June 12, 1956

2,750,444

COMBINED SLIDE AND CARD PROJECTION APPARATUS FOR TELEVISION

Freeman H. Owens, New York, N. Y.

Application November 10, 1951, Serial No. 255,806

21 Claims. (Cl. 178—7.2)

The invention herein disclosed relates to the projection of slides, transparencies, cards and other objects or subjects for television and is a continuation-in-part of inventions disclosed in copending patent applications Serial No. 219,680, filed April 6, 1951, entitled "Prefocused Slide and Card Holder For Television Projectors," Patent No. 2,704,008, March 15, 1955, and Serial No. 236,114, filed July 11, 1951, entitled "Television Apparatus and Optical System."

In accordance with this invention the objects to be projected are mounted in holders and these holders are arranged in a row, one in front of the other, in the sequence in which they are to be used, and automatic mechanism is provided for advancing the row, the extent of one holder at a time, and shifting the front holder laterally over into projecting position, after first removing a previously projected holder from the projecting position, if there has been a previous projection, and stacking the previous holder in a row of used holders.

The invention is particularly concerned with the mechanism for effecting these results.

Special objects of the invention are to assure smooth, easy shifting of the holders from the supply row and accurate positioning and securing of the holders in the projecting position.

Further special objects of the invention are to effect the smooth transition of the holders from the projecting to the stacking or storing position without interruption or delay as projection is completed.

Important objects of the invention are to automatically effect prefocusing adjustment of the holders so that as they reach the projecting station they will be properly focused for the subject matter carried thereby.

Other important objects of the invention are to combine different projectors focused on the mosaic of the same television camera so as to fade or wipe from one effect into another without producing objectionable double exposure effects, except as such effects may be desired.

Special objects of the invention are to provide simple, practical and effective mechanism for accomplishing the results indicated.

Other desirable objects attained by the invention are set forth or will appear in the course of the following specification.

The drawings accompanying and forming part of the specification are illustrative of certain practical and, at this time, preferred embodiments of the invention. Actual structure and relation of parts, however, may be modified and changed in various ways, all within the true intent and broad scope of the invention as hereinafter defined and claimed.

Fig. 1 in the drawings is a diagrammatic plan view illustrating a pair of the transparency and opaque projectors focused in convergent relation upon the mosaic of a single television camera and thereby arranged to fade over images from one projection subject into images of another projector. This view shows also how these projectors may be employed in combination with motion picture projectors and in association with a studio camera for picking up live action on a stage or the like. All images are projected onto the mosaic of the same television camera;

Figures 19, 20, 21, 22:
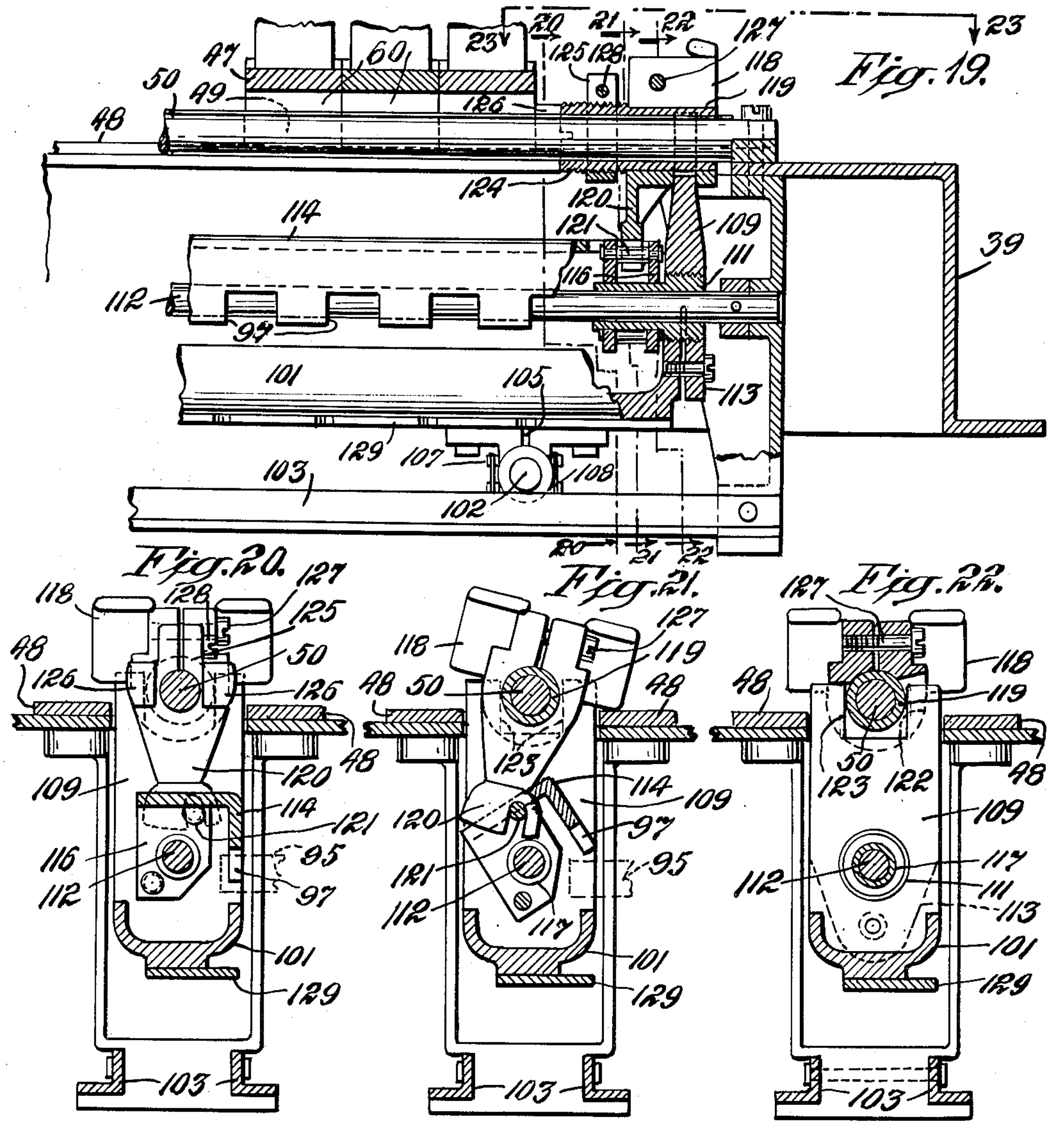
Fig. 19 is a broken vertical sectional view of the shifter carriage and holders.
Figure 23:
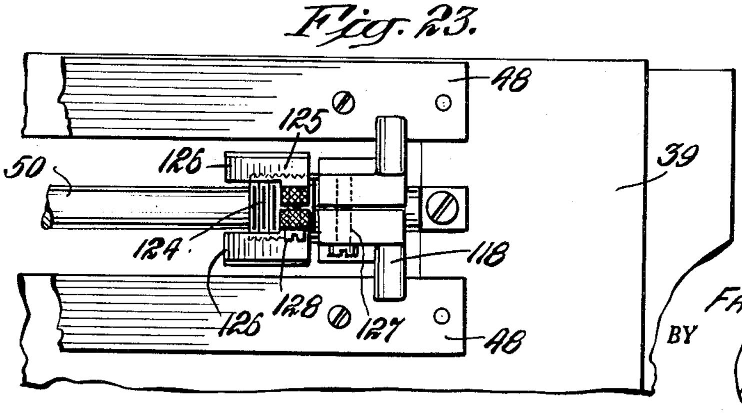
Figures 24, 25, 26, 27, 28:
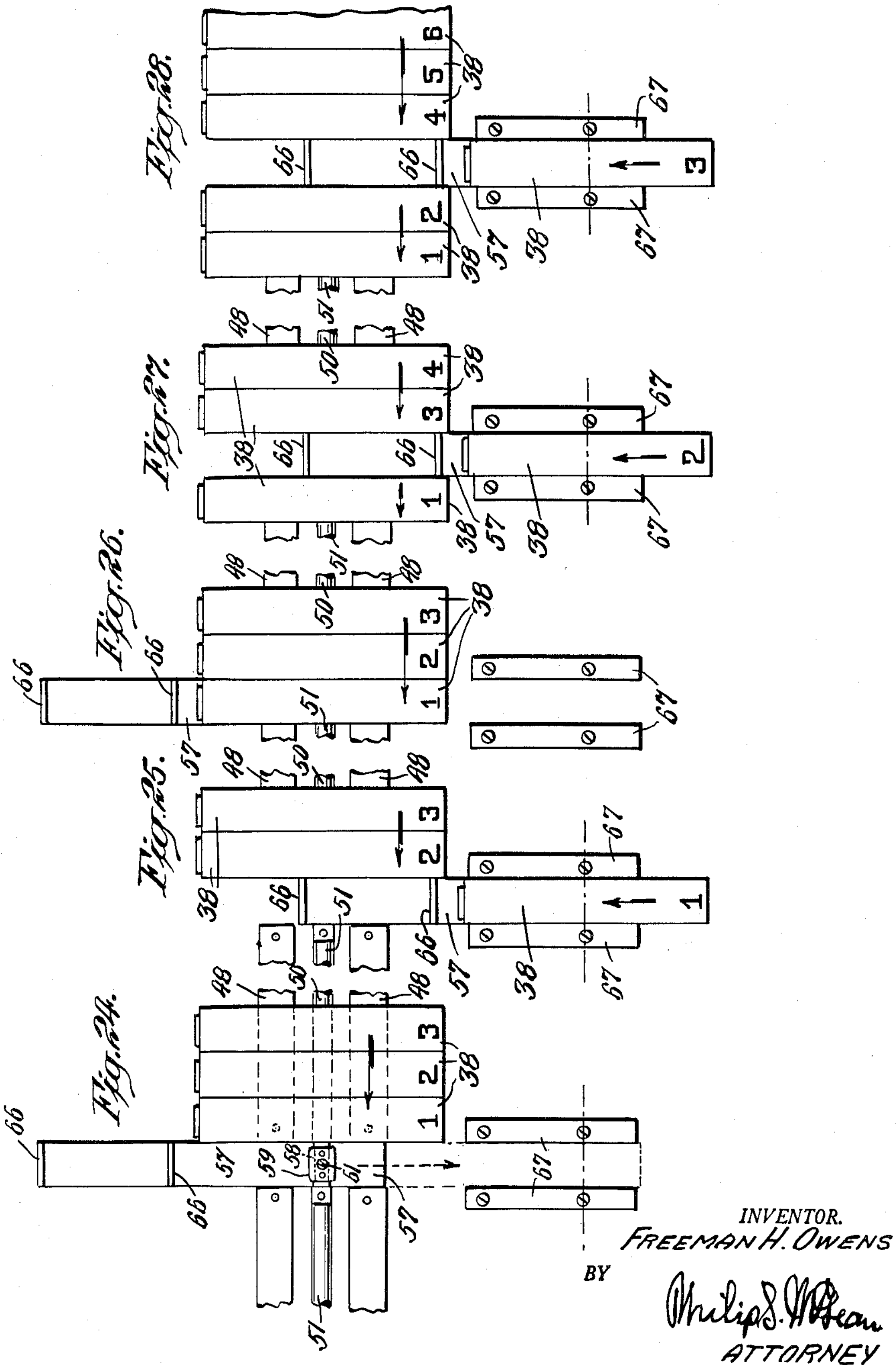
Figure 29:
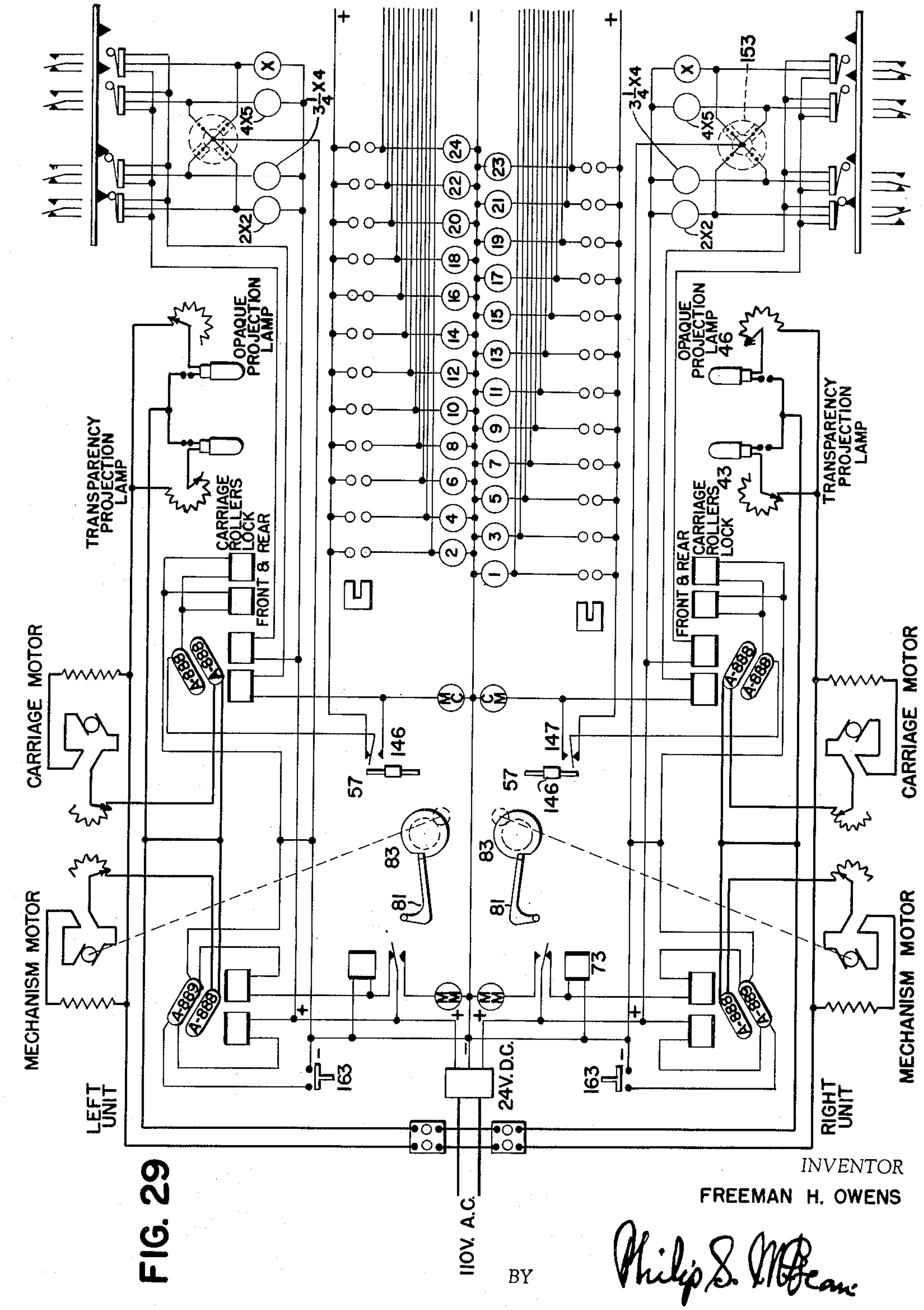

Figs. 20, 21 and 22 are broken cross sectional views as on substantially the planes of lines 20—20, 21—21 and 22—22 of Fig. 19, showing different position of the parts;

Fig. 23 is a broken part sectional plan view as on substantially the plane of line 23—23 of Fig. 19;

Fig. 24 is a broken plan and diagrammatic view showing the No. 1 holder in position to be shifted from the supply stack onto the cross slide;

Fig. 25 is a similar view illustrating this holder shifted from the supply stack into the projecting position;

Fig. 26 is a like view showing the No. 1 holder returned by the slide back into line with the supply and used stacks;

Fig. 27 is a similar view showing the No. 1 holder in the used stack and the No. 2 holder carried by the slide from the supply stack into the projecting position;

Fig. 28 is a like view showing the No. 2 holder withdrawn from the projecting position and added to the used stack, and the No. 3 holder in the projecting position;

Fig. 29 is a wiring diagram.

Figures 1, 2:
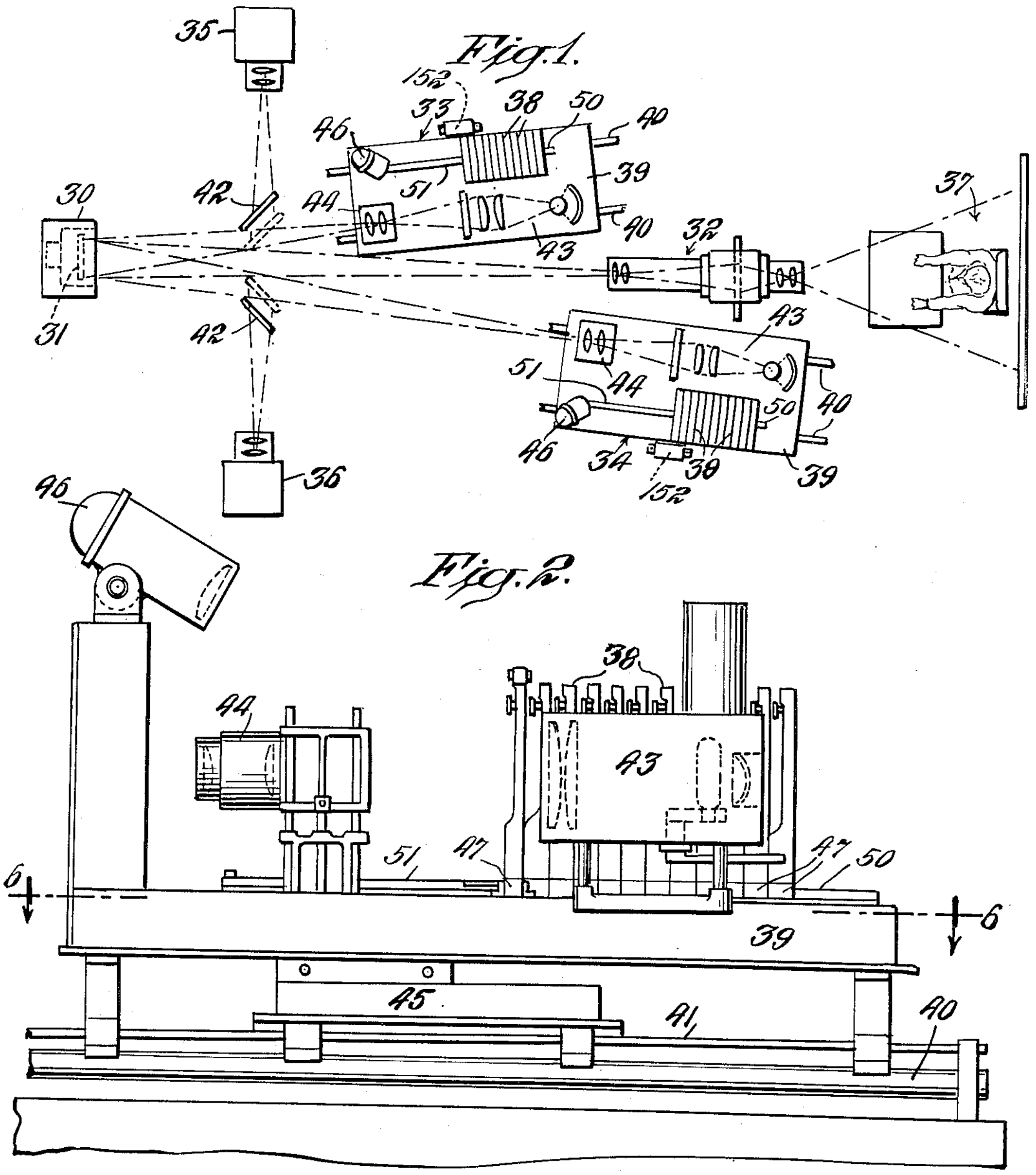
Fig. 2 is a broken side elevation of one of the automatic slide projectors shown in Fig. 1.

In Fig. 1 a typical studio assembly is illustrated comprising a television camera 30 having a mosaic 31 receptive to subject matter projected thereon from the studio camera 32 or from either or both the convergently disposed still projectors at 33, 34, or from either or both the motion picture projectors 35, 36, at opposite sides of the general projection axis.

The studio camera 32, as disclosed in more detail in application Serial No. 236,114, may be used primarily for picking up live action from a stage indicated at 37.

The still projectors 33 and 34 may be used particularly for projecting the subject matter of cards, pictures, slides and transparencies mounted in holders 38 such as disclosed in application Serial No. 219,680.

These holders, as in the application last referred to, may be mounted on carriages 39 arranged for travel on convergently disposed rails or rods 40, confined thereon by guides or retainer rods 41, Fig. 2.

The studio camera and still projectors are disposed in front of and adapted to project their respective subject matter directly onto the mosaic of the camera, as shown by the broken lines indicating the light rays in Fig. 1.

The motion picture projectors 35, 36, are arranged at right angles to the direct projection path and are adapted to project film subjects, either one or both of them, onto the mosaic by means of angularly related reflectors 42 which, as indicated by the broken lines in Fig. 1, may be shifted into and out of projecting position for the mosaic.

Figure 3:
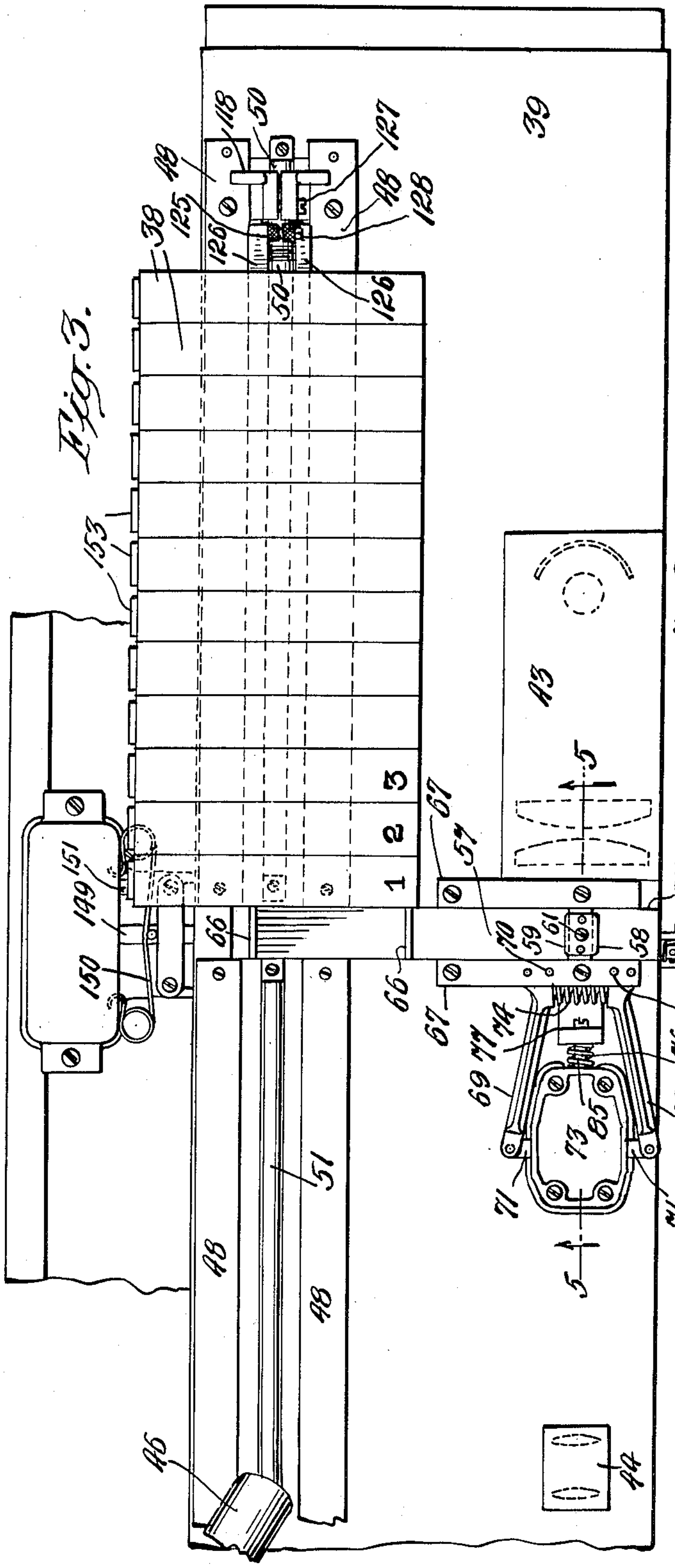
Fig. 3 is a broken plan view of the automatic slide projector.

The projector systems of the still projectors 33 and 34 may be of conventional design with lamps, reflectors and condenser lenses, all as indicated at 43, Figs. 2 and 3, cooperative with projecting lenses 44 on carriages 45 separately adjustable on the track rods 40.

Additionally, the main carriages 39 are shown as supporting lamps 46 for illuminating cards or other opaque objects mounted in the holders 38.

The holders 38 for the subject matter to be projected may be like those disclosed in copending application Serial No. 219,680, comprising frames adapted to support the selected subject matter and having flat base portions 47 to slide on spaced supporting rails 48 and notched at 49 to fit over and be guided by aligned rods 50, 51, spaced as in Fig. 3, to maintain aligned rows of supply and used holders.

In the gap or space between these guide rods and the rows of supply and used holders, a slide 52 operates transversely to transfer a holder first from the head of the supply row into the projecting position at one side of that row and then, after projection, back into register with the used row.

Figure 10:
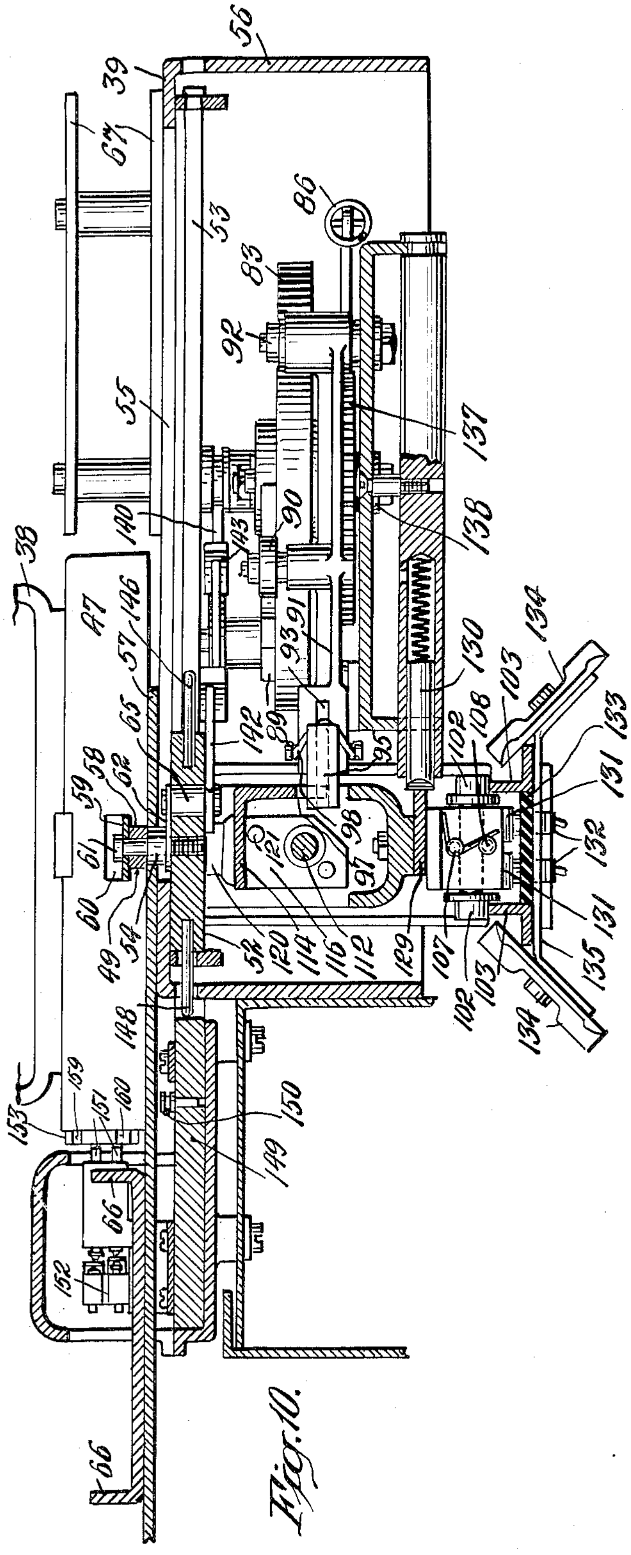
Fig. 10 is a broken transverse sectional view of the cam mechanism on substantially the plane of line 10—10 of Fig. 6.
Figure 13:
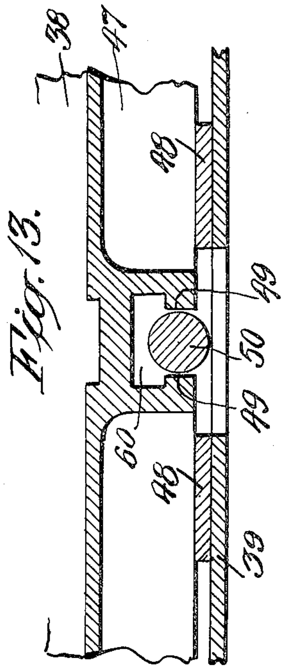
Fig. 13 is an enlarged broken sectional detail showing the base portion of one of the holders as it is notched to fit down over the guide rod for the same.

Specifically this transfer slide 52 is shown as operating on guide rods 53 and as carrying at the top, Fig. 10, a roll 54 operating in a slot 55 in the upright frame structure 56, and above that a top plate 57, a key 58 to engage in the notch or slot 49 in the bottom of the holder, and a spring hold-down plate or washer 59 to engage over the widened or undercut inner portion 60 of the notch.

Fig. 10 shows how a single bolt 61 may be utilized to secure the hold-down plate 59, key 58, top plate 57 and roll 54, all on the reciprocating slide 52.

This same bolt may be utilized to secure the wrist-pin through which the reciprocating movement is imparted to the slide. Thus, as shown in Fig. 10, a thin key plate 62 may be clamped between the top of the slide and the roll 54, this plate having a forked end 63, Figs. 6 and 8, engaging in a groove 64 in the upper end of the wrist-pin 65 which projects up through the slide.

The key 58 engaging in the notch 49 in the bottom of the holder, locates the holder in definitely fixed relation on the slide and the plate 59 retains the holder firmly on the slide, preventing tipping one way or the other.

Fig. 3 may be considered as a plan view of the upper or right-hand projector 34 shown in Fig. 1. In this particular projector the holders are shifted downward or to the left to carry them into projecting position.

In this view, Fig. 3, the transfer slide 52 is shown shifted inward or toward the projecting axis to locate a holder in front of the projecting lamp or in position for illumination of an opaque object such as a card, by the spotlamp 46. In this position the key 58 on the top of the slide is centered on the projecting axis and upstanding stop shoulders 66 at the other or outer end of the slide are located in front of the supply row of holders.

This is the usual position of parts for the loading of the machine.

Therefore with the transfer slide over in the projecting position, a selected group or stack of holders may be placed in the machine, as shown in Fig. 3, with the row aligned by engagement of the notches in the bottom of the holders over guide rod 50 and the front or No. 1 holder up against the stops 66 on the cross slide.

When the machine is started after this first loading operation, the slide 52 is retracted, as shown in Fig. 24, to line up the key 58 with guide rod 50 and with the notches in the holders, then the row of holders is advanced a step to carry the first holder into interlocked engagement over the key and the slide moves inward to carry the No. 1 holder into the projecting position shown in Fig. 25. In this position the stop shoulders 66 come in front of the No. 2 holder, then in front of the supply row.

When the subject matter of the No. 1 holder is projected, the slide retracts, as shown in Fig. 26, to withdraw No. 1 holder from the projecting position into alignment again with the guide rods 50 and 51. Then, as the row of holders is stepped forward for the next projection, the No. 1 holder will be pushed forward into guided position over the rod 51 to start the row of used holders, as in Fig. 27. Following this the slide 52, which has then received the No. 2 holder, shifts inward to carry the latter into the projecting position shown in Fig. 27.

Following these operations the No. 2 holder will be returned into alignment with the row of supply holders and shifted over in back of the No. 1 holder to continue the row of used holders. Then in sequence the No. 3 and following holders will be taken out of line, and after projection, be returned and added to the used holders.

Figure 4:
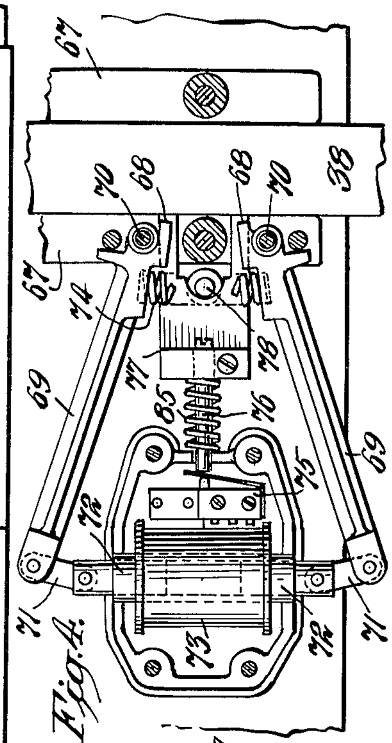
Fig. 4 is an enlarged broken plan view of the electromagnetic clamp for securing the active slide holder in the projecting position.
Figure 5:
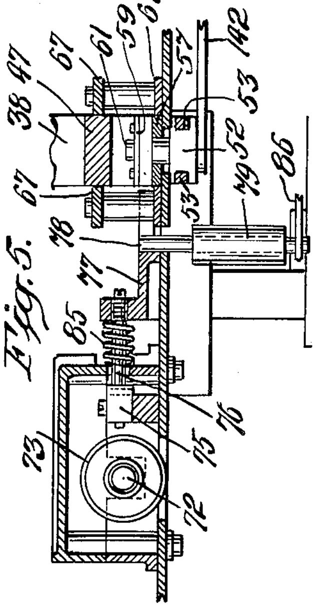
Fig. 5 is a broken vertical sectional view of the holder as on substantially the plane of line 5—5 of Fig. 3.
Figures 6, 7:
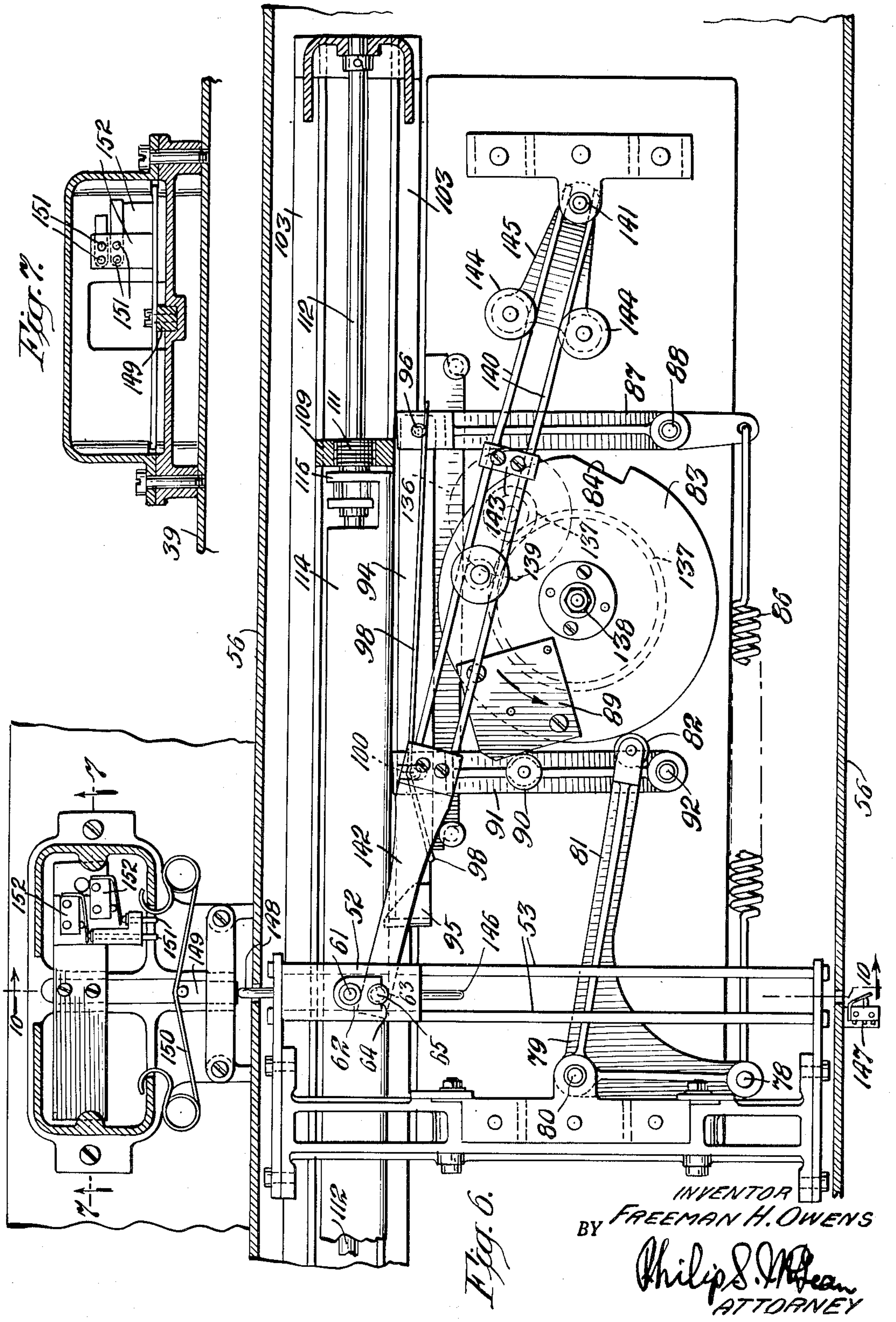
Fig. 6 is a broken horizontal sectional view of the cam and lever mechanism for effecting the operation of the holder transfer slide, this view being taken on substantially the plane of line 6—6 of Fig. 2.
Fig. 7 is a broken sectional detail of the control switch mechanism as on substantially the plane of line 7—7 of Fig. 6.
Figures 8, 9:
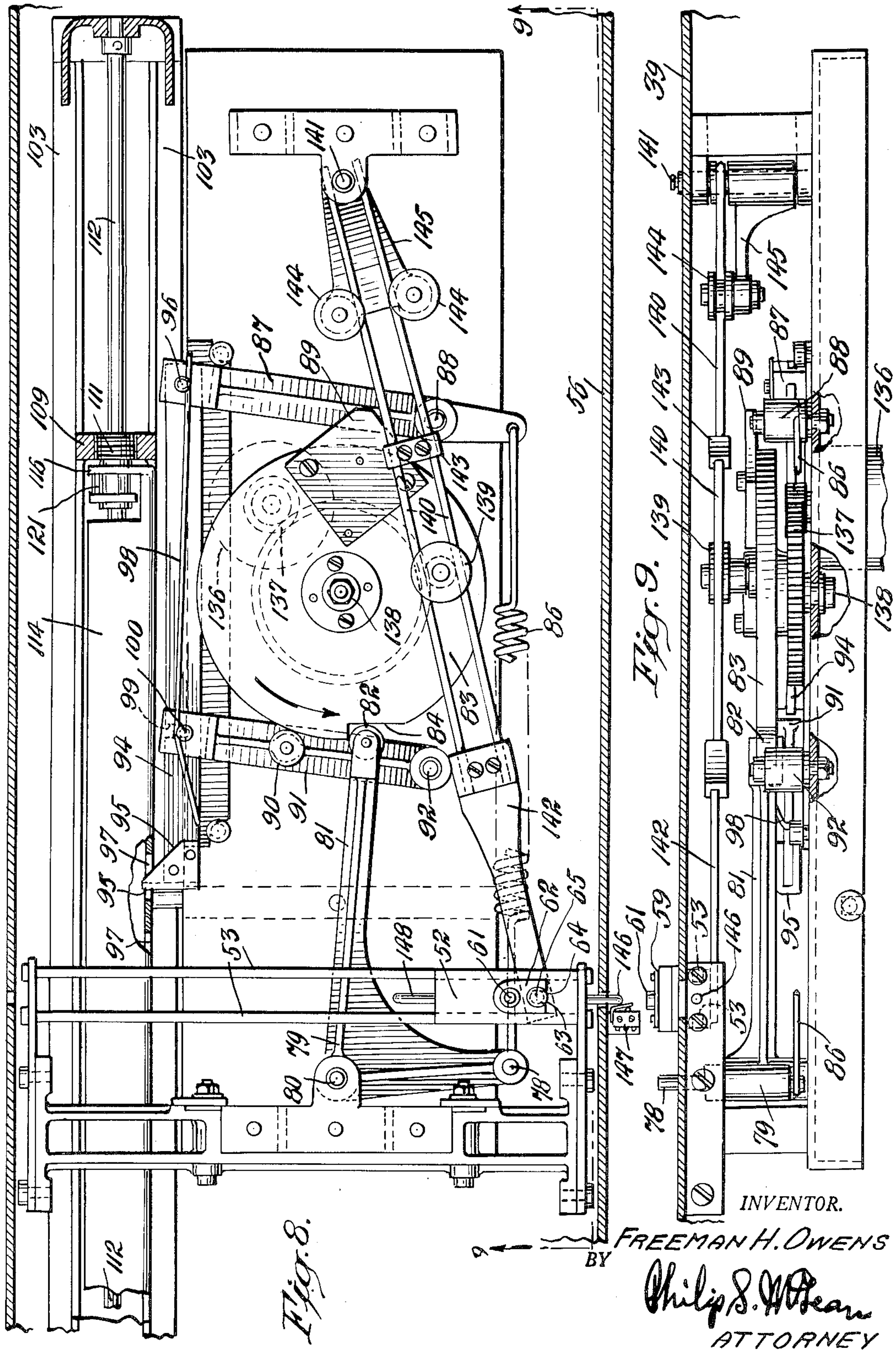
Fig. 8 is a broken plan view similar to Fig. 6, showing the parts in a different position.
Fig. 9 is a broken vertical sectional view of parts appearing as on substantially the plane of line 9—9 of Fig. 8.

At the projecting station the holders are automatically gripped and held against positioning rails or stops 67, Fig. 10, by the projecting ends 68, Figs. 4 and 5, of levers 69, pivoted at 70 and connected by links 71 with the opposed companion cores 72 of a solenoid 73. These holder gripping levers are forced apart into the released position shown in Fig. 4, by an interposed spring 74, and the solenoid is automatically energized during the projecting period by a switch 75 shown as closed by a spring tensioned plunger 76 projecting from a slide plate 77 which is actuated by a pin 78 projecting up from a lever 79 which, as shown in Figs. 6 and 8, is of bell crank construction, pivotally supported at 80 and having an arm 81 carrying a roll 82 in engagement with a cam 83. This cam has a drop in it at 84 to permit bell crank lever 79 to swing far enough for the pin 78 to permit movement of slide plate 77 under impulse of spring 85, Fig. 4, to close the solenoid switch 75.

The switch operating lever 81 is shown tensioned to follow the cam 83, by a spring 86, Figs. 6 and 8, connected between that lever and a lever 87, pivoted at 88, and which carries the dog for operating the holder advancing carriage.

Figures 15, 16, 17, 18:
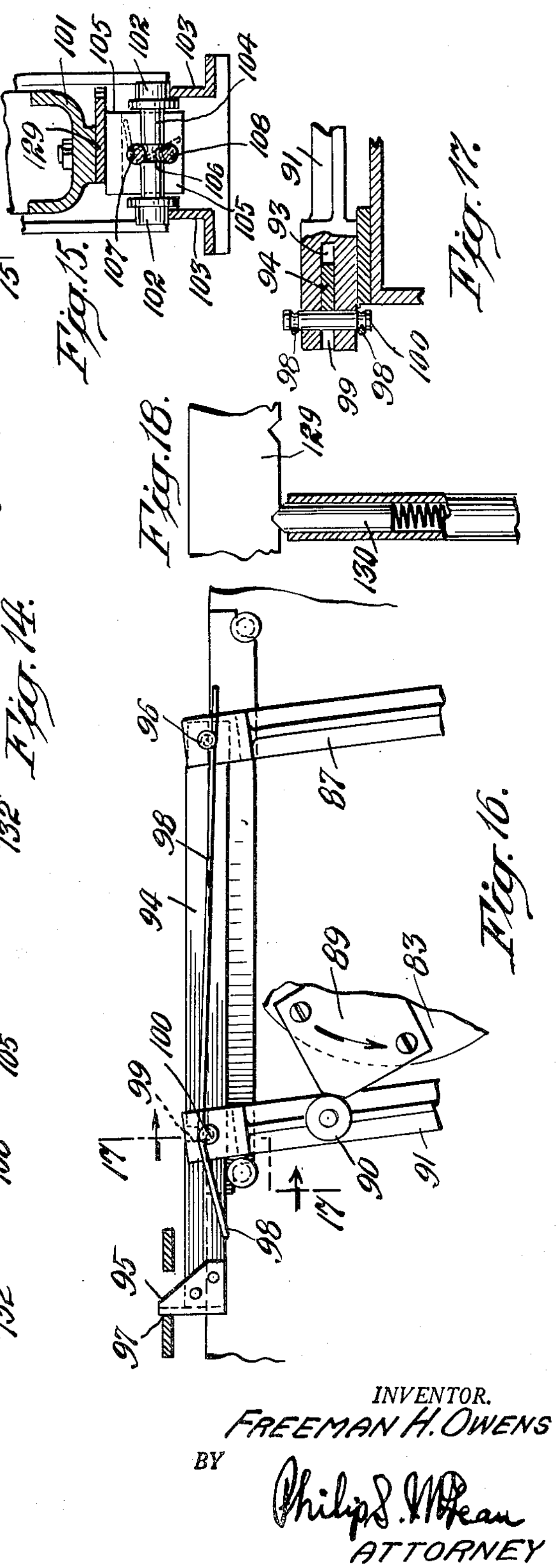
Fig. 15 is a broken vertical sectional detail taken on substantially the plane of line 15—15 of Fig. 14.
Fig. 16 is a broken part sectional plan view illustrating operation of the carriage feed cam mechanism.
Fig. 17 is a broken vertical sectional view of the end portion of the carriage shifter lever on substantially the plane of line 17—17 of Fig. 16.
Fig. 18 is a broken plan and part sectional view illustrating details of the detent mechanism for indexing the carriage.

The mechanism for advancing the holders in the step-by-step relation outlined comprises a second cam 89, Figs. 6 and 8, engageable with the roll 90 on lever 91, pivoted at 92 and slotted in its end at 93, Figs. 10 and 17, to receive the link 94 which carries the dog 95 at one end for actuating the holder advancing carriage. This link is pivotally connected at its opposite end, at 96, with lever 87.

Cam lever 91 and spring lever 87 connected by the dog carrying link 94 constitute a parallelogram for actuating the carriage advancing dog. The latter operates in the nature of a spring pawl, engaging in the notches 97 on the carriage in the forward feeding stroke and dropping back out of engagement with such notches on the retractive, return stroke. The construction permitting such release on the return stroke is, as shown in Figs. 16 and 17, a hairpin spring 98 having the loop of the same engaged in back of the link 94, outward movement of such link being enabled by the mounting of the link in the slotted end 93 of cam lever 91.

That portion of link 94 which is confined in the slot 93 has a notch 99 receiving the pin 100 which extends across the slotted end portion of lever 91, and the spring 98 is shown in Fig. 16 as looped over the extended end portions of this pin.

This construction permits the link carrying the dog 95 to work in and out in the slot 93 while still maintaining a definite connection between the ends of levers 87 and 91.

Figure 14:
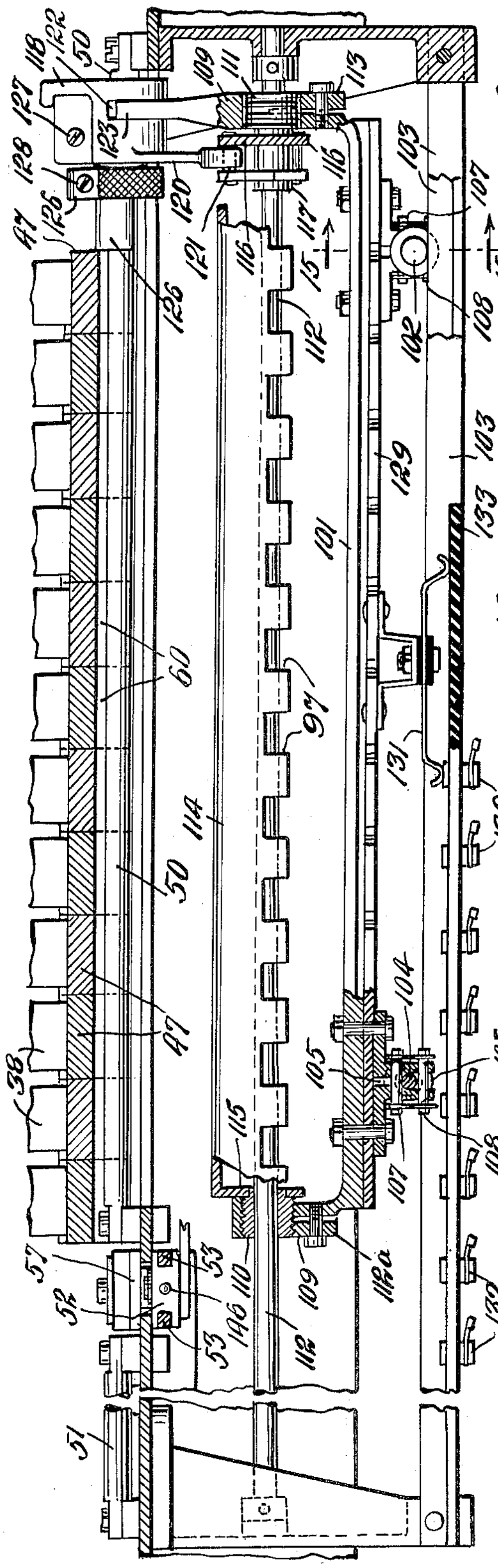
Fig. 14 is a broken longitudinal sectional view showing a group of the holders in the supply position on the guide rod and portions of the automatic switch mechanism for indicating positions of the same.

The holder advancing carriage is shown in Figs. 14 and 15 as made up of a bar-like member 101 having rollers 102 paired to ride on the spaced tracks 103. The axles 104 carrying such rollers are shown mounted free to tilt transversely by being engaged in slots 105 and being grooved at their centers at 106 to rock on pins 107 at the top, lower pins 108 being provided to prevent the rolls and axles from dropping out of the slots 105. This universal mounting of the rollers insures the carriage operating freely and smoothly over the tracks 103.

The carriage bar 101 is shown as having upwardly directed end portions 109 receiving the adjustable screw bushings 110, 111, which slide over the guide rod 112, parallel to tracks 103, and which bushings, when adjusted, can be secured in the adjusted relation in screw clamped split end portions 112*a*, 113, of the carriage.

The notches or shoulders 97 to be engaged by the carriage advancing dog are shown as provided in the edge of an angle plate 114 having angled ends 115, 116, pivotally engaged on bushing 110 and the hub extension 117 of bushing 111, Fig. 14.

Figs. 20 and 21 show how this pivotal mounting of the angle bar 114 enables it to be rocked from a position where the feeding dog 95 will engage in the notches 97 to a position where it will be clear of the dog and thus release the carriage to be shifted back into the starting position.

Means for rocking the notched feed bar 114 are shown in Figs. 19 through 22, in the form of a turn-button 118 pivotally mounted on a sleeve 119 riding the guide rod 50, said button having a dependent, forked leverage extension 120 engaging over a pin 121 on the end of said feed bar 114.

This turn-button 118 is shown in Figs. 19 and 22 as having a grooved lower portion 122 engaged by the fork 123 in the upper edge of the upright end 109 of the carriage so as to travel with and constitute an actual part of the carriage.

The sleeve 119 on which the turn-button is mounted, is shown in Figs. 19 and 23 as having a screw threaded extension 124 at the inner end on which is engaged a screw threaded member 125 having pusher fingers 126 extended to engage the base 47 of the last holder at opposite sides of the notch 49 therein, substantially as indicated in Fig. 3.

The turn-button 118 has a screw closed, split clamp engagement on the sleeve 119 at 127, and the abutment member 125 having a screw adjustment on this sleeve is shown as having a similar screw closed, clamping adjustment at 128. Consequently, upon loosening screw clamps 127 and 128, the sleeve 119 may be rotated to screw the pusher abutment 125 toward or away from the holders, after which adjustment the screw clamps may be tightened, thus to locate the pusher elements of the carriage in proper relation to the holders.

Other adjustments are possible to associate the carriage in proper feeding relation to the holders upon loosening the split clamps 112*a*, 113, Fig. 14, and adjusting the screw bushings 110, 111, to shift the notched feed bar 114 one way or the other on the carriage.

The carriage is indexed through the medium of a notched plate 129 projecting at one side, Figs. 10 and 18, engaged by the relatively stationary spring pressed plunger 130.

This indexing plate is further shown in Fig. 10 as carrying a dependent, arched spring contact 131 engageable with relatively fixed contacts 132 connected by wiring with lamps or other signals for showing in the control room or on a suitable panel, for instance, the exact position of the carriage or the subject matter of the holder being presented.

Fig. 10 further shows how the insulating base strip 133 carrying these indicator contacts, may be removably secured between the carriage rails 103 by turn-buttons 134 carried by cross bars 135 on the underside of this base and arranged when turned properly to reach up over the outstanding base flanges of the supporting rails. This construction permits the entire contact panel being dropped to clean or repair contacts whenever required.

The power for actuating the switch throwing cam 83 and carriage feeding cam 89, is provided in the illustration by a motor 136, Figs. 8 and 9, geared at 137 to the shaft 138 carrying said cams.

The drive for actuating the cross slide 57 is taken from this same shaft through the medium of a roller 139 mounted on the disc portion of cam 83 and operating as a rolling crank between the spaced parallel spring rods 140 pivotally supported at one end at 141 and connected with wrist-pin 65 at the opposite end.

These spring rods are maintained in parallel relation by the head member 142, in which they are clamped at the outer end and which directly engages the wrist-pin 65, and by the clamp 143 near the inner pivotal end.

The extreme inner end portions of the flexible pitman rods 140 straddle the fixed pivot 141 which may be in the form of a positioning roller, and the free portions of the rods guide between the spaced grooved rollers 144 carried by a swinging yoke 145 pivoted on center 141.

This construction provides a flexible crank and pitman drive for transversely reciprocating the holder transfer slide 57, and the spring rods 140 are sufficiently flexible to permit the crank to travel over dead center at opposite ends of the stroke, while temporarily stopping and holding the slide at opposite ends of its travel.

The bending of the flexible pitman lever at opposite ends of its stroke provides a dwell at each end of the stroke of the slide 57, and these dwell periods are utilized for different purposes, one at the end of the outward movement of the slide, shown in Fig. 6, for holding certain switch parts out of the way when the holders are stepped forward, and the delay at the end of the inward movement of the slide, Fig. 8, for holding the switch controlling the carriage movements for focusing and picture size adjustments.

Fig. 3 shows the stopped, projecting position of the parts with the slide 57 all the way inward and the solenoid 73 energized to grip the holder, which at that time would be in position for the clamp levers 69 to clamp the base of the holder against the back plate 67, the condition illustrated in Figs. 25, 27 and 28.

In this stopped position the cam roll 82, as shown in Fig. 8, has dropped into depression 84, causing the pin 78 on lever 79 to let the switch 75 close to energize solenoid 73, so that this solenoid will secure the holder in use firmly located during the whole projecting period.

Also, at this time a projecting pin 146 on the inner end of the slide 52 has engaged and operated a microswitch 147 which controls circuits for effecting the focusing and picture size adjustments and indicator lamps.

A projecting pin 148 on the opposite, outer end of slide 52 operates, as shown in Figs. 6 and 10, to push out a slide 149 against tension of spring 150, which slide carries the pins 151 for actuating four correspondingly located switches 152.

The purpose of thus retracting these switch actuating pins is to clear them from engagement with selector cams on the holders which are adjusted to set up the circuits for accomplishing the focusing and picture size adjustments, when the slide holders are moved forward over rod 50.

Figures 11, 12:
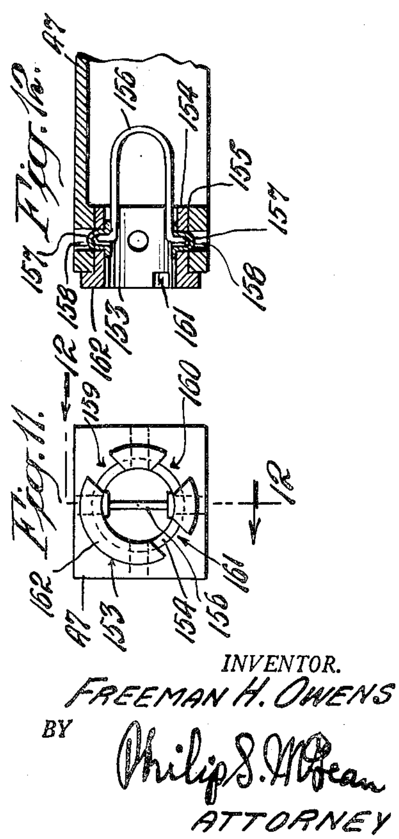
Figs. 11 and 12 are end and broken longitudinal sectional views of the presetting control mechanism, Fig. 12 being taken on substantially the plane of line 12—12 of Fig. 11.

The selector cams which can be set to automatically accomplish focusing and picture size adjustments of the main carriage and lens carriage, appear at 153, Figs. 3 and 10, and are shown in detail in Figs. 11 and 12.

In these latter views it will be seen that each cam consists of a cylindrical member 154 rotatably mounted in a corresponding seat 155 in the end of the holder base 47, retained and indexed therein by a hairpin spring 156 having at its ends thimbles 157 engageable in index openings 158 in the base.

The outer end, forming the face of the cam, is in the nature of a flange having three notches 159, 160, 161, spaced in three-quarter relation, leaving a blank solid portion 162 for the fourth quarter of the end of the cam. As a consequence this cam can be positioned to engage and operate any one of the four equally spaced switch operating plungers 151 and to miss the other three, the first or selected plunger engageable by the solid portion of the cam and the other three lining up with the notches in the cam.

The four switch actuating plungers 151, as shown in Figs. 3, 6 and 7, are located to line up with the holder at the head of the supply column, which in Fig. 3 is the No. 1 holder.

As this stack of holders is placed in position on the machine the front holder, in coming up against the front stops 66, will carry the selector cam 153 on the outer end of the same into position over the four switch plungers, with three of these plungers entering the notches in the cam and the fourth engaging and being actuated by the solid portion 162 of that cam.

The switch 152 which has been thus selected will energize a motor provided for effecting required adjustments of the main carriage 39 for picture size and independent adjustment of the lens carriage 45 for focusing. These picture size and focusing adjustments are made by the motor provided for this purpose in a predetermined cycle of operation disclosed and claimed in a related copending application, Serial No. 219,680, filed April 6, 1951, Patent No. 2,704,008, March 15, 1955.

When the machine, after loading and selecting circuits for focusing and size adjusting, as shown in Fig. 3, is started, as for example by operating a push-button or other form of controlling switch 163 for the motor 136, the slide 52 will withdraw from the projecting position and move outward to pick up the No. 1 holder.

In so doing the projection 146 on slide 57 will leave the switch 147, Fig. 3, permitting that switch to open the indicator lights and energize the circuit or circuits just previously set up by the selector cam.

Consequently when the No. 1 holder is picked up by the slide and shifted over into projecting position, as shown in Fig. 25, the machine will have been automatically adjusted for size of picture and focus determined by the selector cam.

This follows for each holder in succession, the selector cam on each holder setting up the adjustment circuits required for that holder and which circuits will become effective and will have performed their proper functions when that particular holder has reached the projecting position.

The outward movement of the transfer slide, as shown in Fig. 6, retracts the switch operating plungers 151 so that these do not project and interfere with the forward stepping of the holders. On inward movement of the slide, however, the projection 148 on the outer end of the slide permits the plate 149 to move inward under force of the spring 150 to carry the plungers 151 inward far enough for the selected one of these plungers to be actuated by engagement with the solid portion 162 of the selector cam.

The travel of the holder advancing carriage 101 through the medium of switch contact 131, Fig. 14, provides a check for the operator in the control room to see on an annunciator or other form of indicator, just which holder is being advanced into projecting position.

When the button 118 at the end of the stack is turned over to release the rack 114 from the feed dog or pawl 95, as shown in Fig. 21, the carriage is freed to be shifted by hand back into the starting position.

The holders may be lifted off the guiding and supporting tracks at any time and any one holder be substituted for another for change of program purposes.

The holders may be made with selector cam seats 155 in opposite ends, thus to enable the same holders to be used in either a right or left-hand projector such as shown at 33 and 34 in Fig. 1.

By properly setting the selector cams on the holders the convergently arranged projectors 33 and 34, at opposite sides of the projection line, may be caused to automatically focus and adjust to size for subject matter carried by each successive holder, and many desired effects may be obtained such as fading or wiping, from one picture into another, enlarging and reducing in size from one picture into the next, and such effects may be further varied by the use of shutters and increasing and decreasing illumination and the like. These operations may be combined with, interspersed, or used independently of the film projectors 35 and 36, at opposite sides of the projection lane.

Practically any desired effects, as above indicated, may be obtained, the projection lens 44 preferably having both vertical and horizontal adjustments on carriage 45 and the latter automatically adjusted for focusing purposes.

All or any of these adjustments may be continuous and may be combined with the live action projected by the studio camera 32 directly onto the mosaic, as in Fig. 1. With this continuous projection different data and live action may be enlarged or reduced on the television screen.

The invention is of particular value to smaller television stations, enabling variations in programs to be accomplished with a minimum of studio equipment.

The projection machines, involving the movable carriages 39 at opposite sides of the direct projection path, carrying the holders 38 for the cards, transparencies and other subject matter and conditioned to effect positioning at the selected distance from the mosaic of the television camera and the maintaining of the projection lens in focus, may be started by operation of a simple starter button such as 163, in the control room or other suitable location.

With parts as in the Fig. 3 position and the actuating mechanism as in Fig. 8, the cross slide 57 will be withdrawn from the projecting position, Fig. 3, to the extreme outer position, Fig. 24, to take the No. 1 holder, and will then travel inward as in Fig. 25, to the stopped position, transferring the first holder to and leaving it in the projecting position, where it will then be firmly held by the solenoid clamp 73, Fig. 3.

The time lag occasioned by bending of the flexible pitman 140 at the extreme limits of its outward throw, Figs. 6 and 8, provides necessary time for retracting and holding the selector pins 151 retracted while the row of holders is being advanced up to the cross slide.

The feed dog 95 actuated by cam 89, Figs. 6 and 8, advances the supply row of holders the extent of one holder. This intermittent feed movement may be accomplished by other means than that shown, such, for example, as an endless chain construction.

The upstanding abutments 66 on the cross slide serve as stops limiting the forward position of the front holder, as in Fig. 25. As the row of used holders builds up, as shown in Figs. 27 and 28, the stops 66 operate as spacers between the back of the used row and the front of the supply row. Also, these stops serve to prevent a holder being placed in the machine between the supply and used rows.

When projection of a subject is completed the machine may be started again, manually or automatically, to replace the projected subject by the subject matter of the next holder, as indicated in Figs. 26, 27 and 28. In effecting these subsequent operations one projector may be substituted for the other, according to desired projection effects.

The wiring diagram accompanying and forming part of this disclosure illustrates in simplified form the circuits and controls which may be employed to accomplish the results described, parts entitled to accord with the description herein.

What is claimed is:

1. Apparatus for projecting a succession of selected subjects, comprising holders for the subject matter to be projected, means for slidably supporting said holders one in front of another in a horizontal row, said holders having registering notches in the bottom of the same and said supporting means including aligned horizontally extending guide rods engageable in said notches and separated by a transverse gap of the approximate width of said holders whereby a supply of new holders may be located over one of said guide rods and used holders located in alignment over the other of said guide rods, a cross slide operating horizontally in said gap between the guide rods in register with said supporting means and having an upstanding key to register with said guide rods and to enter the notch in the bottom of a holder seated on said cross slide, a projector mounted at one side of said supporting means and having guide means for a holder in register with said cross slide, means for stepping the holders in the supply row forwardly over the cross slide, one at a time, and means for reciprocating said cross slide to carry a holder engaged thereon transversely into position in said guiding means of the projector and back into position in register with holders in the used row of holders.

2. Apparatus for projecting a succession of selected subjects, comprising holders for the subject matter to be projected, means for slidably supporting said holders one in front of another in a horizontal row, said holders having registering notches in the bottom of the same and said supporting means including aligned horizontally extending guide rods engageable in said notches and separated by a transverse gap of the approximate width of said holders whereby a supply of new holders may be located over one of said guide rods and used holders located in alignment over the other of said guide rods, a cross slide operating horizontally in said gap between the guide rods in register with said supporting means and having an upstanding key to register with said guide rods and to enter the notch in the bottom of a holder seated on said cross slide, a projector mounted at one side of said supporting means and having guide means for a holder in register with said cross slide, means for stepping the holders in the supply row forwardly over the cross slide, one at a time, and means for reciprocating said cross slide to carry a holder engaged thereon transversely into position in said guiding means of the projector and back into position in register with holders in the used row of holders, a clamp for gripping a holder positioned in said guiding means of the projector and means operating in timed relation to said cross slide for setting said clamp into gripping engagement with a holder supported by said cross slide in said guide means of the projector and for releasing said clamp means when the cross side is shifting a holder into and out of position in said guide means.

3. Apparatus for projecting a succession of selected subjects, comprising holders for the subject matter to be projected, means for slidably supporting said holders one in front of another in a horizontal row, said holders having registering notches in the bottom of the same and said supporting means including aligned horizontally extending guide rods engageable in said notches and separated by a transverse gap of the approximate width of said holders whereby a supply of new holders may be located over one of said guide rods and used holders located in alignment over the other of said guide rods, a cross slide operating horizontally in said gap between the guide rods in register with said supporting means and having an upstanding key to register with said guide rods and to enter the notch in the bottom of a holder seated on said cross slide, a projector mounted at one side of said supporting means and having guide means for a holder in register with said cross slide, means for stepping the holders in the supply row forwardly over the cross slide, one at a time, and means for reciprocating said cross slide to carry a holder engaged thereon transversely into position in said guiding means of the projector and back into position in register with holders in the used row of holders, said key being disposed toward one end of said cross slide and a stop disposed toward the opposite end of said cross slide and engageable by the front holder in the supply row of holders when the cross slide has shifted a holder into position in the projector.

4. Apparatus for projecting a succession of selected subjects onto the mosaic of a television camera, comprising optical projecting means, means supporting the same in projecting relation, holders for the subject matter to be projected, means for aligning said holders one in front of the other in a row at one side of said optical projecting means, means for shifting said holders, one at a time, laterally from the front of said row into registry with said optical projecting means, means for advancing the row of holders step-by-step as individual holders are removed from the front of the row of holders, control means for the apparatus located at a point adjoining the front of the row of holders and actuators for variably actuating said control means, said actuators being mounted on the ends of said holders in position to engage said control means in the step-by-step advancing movement of the holders and whereby each holder as it is advanced will effect actuation of the control means prior to said holder being shifted into registry with the optical projecting means.

5. Apparatus for projecting a succession of selected subjects onto the mosaic of a television camera, comprising optical projecting means, means supporting said optical projecting means in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, there being two such apparatuses mounted on carriages and there being two tracks arranged to travel said apparatuses on convergent lines toward and away from the mosaic of the television camera and means adjustable on individual holders on the carriages for effecting adjustments of said carriages in accordance with subject matter of the individual holders.

6. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, said optical projecting means including a lens mounted on a carriage adjustable for focusing purposes and said holders being supported on a carriage separately adjustable for picture size purposes and means controlled by individual holders for effecting focusing and picture size adjustments of said carriages in accordance with the subject matter of individual holders.

7. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, an electromagnet, a clamp operable thereby to secure a holder in the projecting position and means for energizing said electromagnet to secure the holder during the time of projection and to release the holder during the shifting operations described.

8. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, a solenoid, cores operable in opposite ends of said solenoid, levers connected with said cores and operable to clamp a holder in the projecting position and means synchronized with said lateral shifting means and said holder advancing means for energizing said solenoid while a holder is in the projecting position and for deenergizing said solenoid during said lateral shifting and advancing operations.

9. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, cams on said holders adjustable to different positions and means located for cooperation with said cams when said holders reach the position for lateral shifting and arranged to control the apparatus in accordance with the setting of the cam on each holder.

10. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, selector cams on said holders adjustable in accordance with subject matter carried by the holders and mechanism cooperable with the cams as the holders reach the position for lateral shifting and arranged to control the apparatus according to the particular subject matter about to be projected from any given holder.

11. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, said means for advancing the holders including a pair of parallel levers, a link pivotally connecting said levers in parallel relation, a feed dog carried by said link, a rack engageable by said feed dog and arranged to impart the step-by-step movements to the holders, one of said levers having a slot in which said link is confined for movement toward and away from the rack, a spring thrusting the link in the direction to engage the dog with the rack and means cooperable with one of said levers for imparting oscillating movement to the pair of connected levers.

12. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, said lateral shifting means including a holder engaging slide, an operating crank and a pitman lever connected with said slide and actuated by said crank, said pitman lever being flexible to yield at the end of travel of the slide in opposite directions and thereby to permit dwell of the slide at opposite ends of said travel while the crank continues in operation.

13. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, said lateral shifting means including a holder engaging slide having limited travel in opposite directions, a crank, a swinging pitman lever connected with said slide and operatively engaged by said crank, said pitman lever being composed of substantially parallel flexible rods yieldable at opposite ends of the slide travel to permit continued operation of the crank with the slide remaining at rest at the opposite ends of its limited travel.

14. Apparatus for projecting a succession of selected subjects onto the mosaic of a television camera, comprising optical projecing means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, said holders having undercut notches, the aligning means including a guide rod engageable in said notches and said lateral shifting means having a key engageable in said notches and a retainer plate engageable in the undercut portions of the notches.

15. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, control means for the apparatus, means on the individual holders for actuating said control means and means for automatically retracting said control means out of the path of said actuating means on the holders as the holders are advanced into the position for operation by the lateral shifting means.

16. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, said laterally shifting means including a reciprocating slide, means positioned for actuation by said slide on the outward stroke of the same for controlling operation of the apparatus and switch means for energizing said control means by movement of said slide at the opposite ends of its stroke.

17. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, and said apparatus further including aligned guides for the unused and used holders, said aligned guides being separated by a transverse gap between the same and said lateral shifting means operating in said transverse gap between the guides for the unused and used holders and comprising a slide having a key, the holders having notches in the bases of the same engageable over the guides and over said key on the slide.

18. Apparatus for projecting a succession of selected subjects onto the mosaic of a television camera, comprising optical projecting means, means supporting the same in projecting relation, holders for the subject matter to be projected, means for aligning said holders, one in front of the other, in a row at one side of said optical projecting means, means for shifting said holders, one at a time, laterally from said row into registry with said optical projecting means and then after projection, out of registry with said optical projecting means, to clear the same for the next holder, and means for advancing the row of holders step-by-step as individual holders are removed from the row of holders, and said apparatus further including aligned guides for the unused and used holders, said aligned guides being separated by a transverse gap between the same and said lateral shifting means operating in said transverse gap between the guides for the unused and used holders and comprising a slide operating in said gap and having a key element at one end for interlocking engagement with the holders and a stop at the opposite end for positioning in front of the holders.

19. Combined projection apparatus for television, comprising a single television camera having a mosaic, carriages at opposite sides of the direct path of rays to the mosaic of said camera, leaving said television camera clear for live action and other televising operations, tracks supporting said carriages and convergently inclined toward said camera enabling adjustment of said carriages on convergent lines toward and away from said television camera, optical projecting means on each of said carriages, interchangeably usable holders for projection material on said carriages and means on the carriages for automatically shifting the individual holders thereon into and out of cooperative relation with the optical projecting means on said carriages.

20. Combined projection apparatus for television, comprising a single television camera having a mosaic, carriages at opposite sides of the direct path of rays to the mosaic of said camera, leaving said television camera clear for live action and other televising operations, tracks supporting said carriages and convergently inclined toward said camera enabling adjustment of said carriages on convergent lines toward and away from said television camera, optical projecting means on each of said carriages, interchangeably usable holders for projection material on said carriages and means on the carriages for automatically shifting the individual holders thereon into and out of cooperative relation with the optical projecting means on said carriages, and selectors on said holders individually adjustable for controlling the projecting operations for each individual holder.

21. Television projection apparatus comprising optical projecting means, holders for the subject matter to be projected, means for aligning said holders in a row at one side of said optical projecting means, a cross slide located at the front of said row of holders and equipped with means for retaining a holder in position thereon, means for reciprocating said cross slide to transfer the front holder of said row into alignment with said optical projecting means and then after projection, back into alignment with the row of holders, means for stepping said row of holders forward after each projection to shift the holder last projected, forward to form a row of used holders spaced the width of said cross slide in front of said first mentioned row constituting the supply row of holders, and stop means on said cross slide in position to hold back the next holder of the supply row when the front holder has been shifted over into projecting position and to operate as an interposed spacer between the last holder of the used row and the front holder of the supply row.

References Cited in the file of this patent

UNITED STATES PATENTS 998,305 Roebuck ______________ July 18, 1911

(Other references on following page)

UNITED STATES PATENTS

| | | |
|---|---|---|
| 1,199,733 | Dietz | Sept. 26, 1916 |
| 1,402,791 | Petherick | Jan. 10, 1922 |
| 1,850,903 | Tryon et al. | May 22, 1932 |
| 2,088,516 | Grier | July 27, 1937 |
| 2,207,716 | Bumstead | July 16, 1940 |
| 2,243,084 | Browne | May 27, 1941 |
| 2,341,098 | Hansen | Feb. 8, 1944 |
| 2,427,164 | Stechbart | Sept. 9, 1947 |
| 2,460,359 | Page | Feb. 1, 1949 |
| 2,543,066 | Salinger | Feb. 27, 1951 |
| 2,566,509 | Albright | Sept. 4, 1951 |